United States Patent [19]

Chisholm et al.

[11] 4,406,033
[45] Sep. 27, 1983

[54] FASTENER FOR ATTACHMENT OF A CONTINUOUS ARTICLE TO A SUPPORT

[75] Inventors: Lisa E. Chisholm, Oak Park; Richard F. Daubert, Tinley Park, both of Ill.

[73] Assignee: Illinois Tool Works Inc., Chicago, Ill.

[21] Appl. No.: 286,145

[22] Filed: Jul. 23, 1981

[51] Int. Cl.³ .............................................. A47G 27/04
[52] U.S. Cl. ........................................ 16/4; 24/208 A; 411/373; 411/510
[58] Field of Search .................. 16/4, 6, 8; 411/373, 411/375, 508, 509, 510; 24/208 A, 213 R, 216, 217 R

[56] References Cited

U.S. PATENT DOCUMENTS

| | | | |
|---|---|---|---|
| 724,884 | 4/1903 | Kingston | 16/4 X |
| 1,488,450 | 3/1924 | Dews | 16/4 X |
| 1,732,203 | 10/1929 | Kimbell | 16/4 X |
| 3,243,858 | 4/1966 | Melanson | 24/208 A |
| 3,272,059 | 9/1966 | Lyday et al. | 24/208 A X |
| 3,717,066 | 2/1973 | Maurer | 411/508 |
| 4,033,011 | 7/1977 | Endo et al. | 16/4 X |
| 4,318,208 | 3/1982 | Borja et al. | 411/508 X |

Primary Examiner—Fred Silverberg
Attorney, Agent, or Firm—Jack R. Halvorsen; Thomas W. Buckman

[57] ABSTRACT

A multi-part fastener assembly for attachment of a carpet-like member to a support. The fastener is designed to minimize snagging and/or scraping-type of engagement with objects that come in contact therewith. The exposed fastener part is an annular member which has a radiussed outer edge from which a plurality of rigid projections extend. The projections are designed to be able to penetrate the carpet-like member and a radially extending flange of another fastener part and be folded to fixedly position the fastener relative to the carpet-like member. The radially extending flange has areas of reduced thickness to ease the projections therethrough and is deflected to create an annular mounding of the carpet-like member around the annular member to cooperate therewith in increasing the resistance of the fastener to snagging type of engagement.

12 Claims, 8 Drawing Figures

U.S. Patent  Sep. 27, 1983  4,406,033
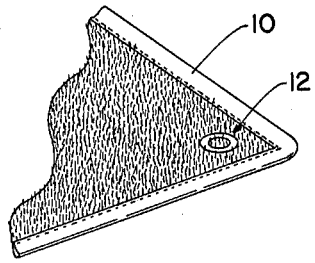
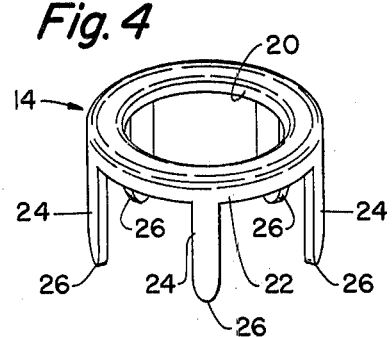
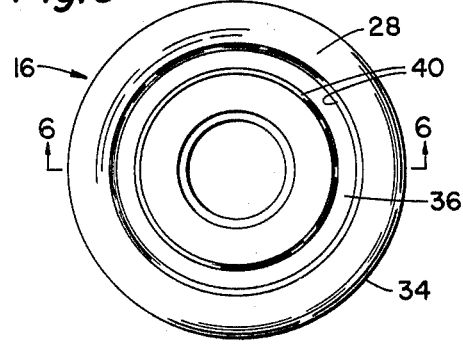
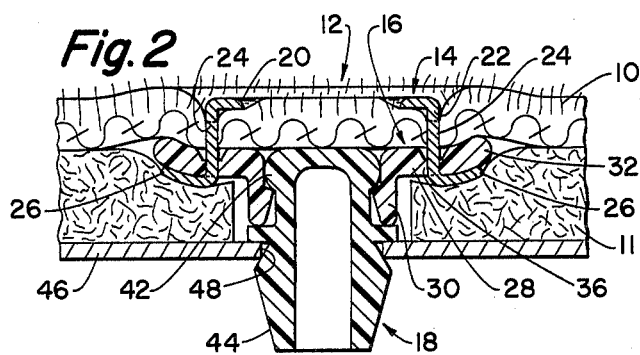
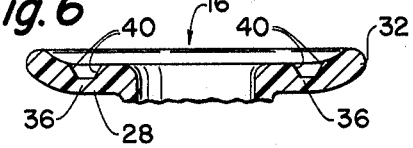
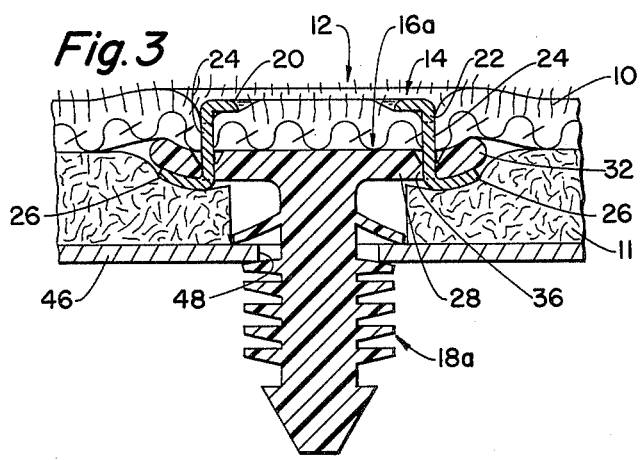
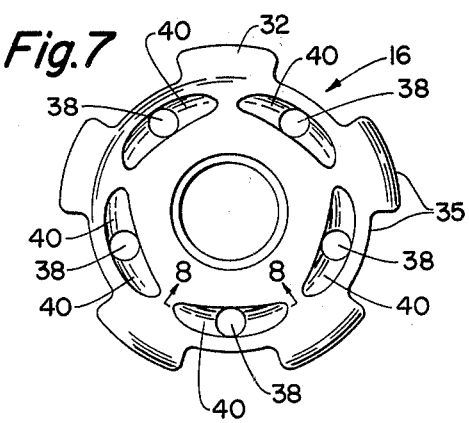
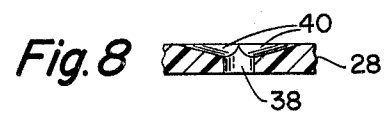

FASTENER FOR ATTACHMENT OF A CONTINUOUS ARTICLE TO A SUPPORT

BACKGROUND OF THE INVENTION

There is a general need, especially in the automotive industry, for simple and easy to install fasteners for attachment of carpets and door panel covers. Various alternate expedients have included the use of adhesives, special fasteners which require a special aperture in the panel, rivet-like fasteners which preclude easy removal, and fasteners of the type contemplated here but, which do not have the easy to camouflage' anti-snag design as taught by applicant, etc.

Typically the auto industry requires that the parts used be efficient and cost effective. Thus, less material and fewer parts to accomplish essentially the same end result but, in a more satisfactory manner, is what we are striving for.

SUMMARY OF THE INVENTION

The instant invention relates to fasteners in general and more particularly to a fastener which effectively eliminates any snagging of the exposed portion of the fastener by an object that contacts therewith. The invention eliminates the need for any special apertures in the carpet or panel and leaves only a small portion of the fastener exposed. The remaining exposed portion is easily camouflaged by the fiber of the carpet and/or by color coordinating the fastener with the vehicle interior.

The fastener comprises a plurality of parts which may be quickly and easily assembled. In one embodiment there are two parts which sandwich the carpet or panel there between. One of the parts is an annular member with rigid but foldable projections extending substantially orthogonally from the outer edge of the annular member. The other part has a radially extending flange through which the rigid projections penetrate and a projection fastening means for anchoring the fastener to a support. The projecting fastening means may be any of a number of alternatives, one of which may be a Christmas-Tree ® panel fastener as produced by Illinois Tool Works Inc. (see U.S. Pat. No. 3,810,279). Another embodiment of the invention has a plurality of parts. Two of the parts are essentially the same as in the above described embodiment except that the projecting fastening means is replaced by one of the parts of a male/female type of fastener. In this embodiment there is a third part having means to fix it relative to the support and the complementing part of the male/female fastener.

The carpet-like member is sandwiched between the first two fastener parts but is releasible from the third fastener part which is fixed relative to the support surface.

BRIEF DESCRIPTION OF THE DRAWINGS

FIG. 1 is a perspective view of a corner of a piece of carpet with the fastener of this invention attached thereto;

FIG. 2 is an elevational view in partial section of one embodiment of this invention shown in installed position for attaching a carpet-like member to a support surface;

FIG. 3 is an elevational view in partial section of another embodiment of this invention shown in installed position for attaching a carpet-like member to a support surface, the fastener being shown in cross section;

FIG. 4 is a perspective view of the coupler part of the fastener;

FIG. 5 is an end view of the first embodiment of the radially extending flange of the flanged retainer of this invention;

FIG. 6 is a cross sectional view of the radially extending flange taken along line 6—6 of FIG. 5;

FIG. 7 is an end view of another embodiment of the radially extending flange of the flanged retainer of this invention; and FIG. 8 is a cross sectional view of the radially extending flange taken along line 8—8 of FIG. 7.

DESCRIPTION OF THE PREFERRED EMBODIMENTS

Referring now to the drawing wherein like reference numerals designate identical or corresponding parts throughout the several views. For convenience of illustration FIG. 1 shows only a corner of a carpet 10 with the fastener 12 attached thereto.

The multi-part fastener 12 as shown in FIG. 2 includes three parts, i.e. an annular coupler 14, a flanged retainer 16, and a fixed connector 18. Coupler 14 includes an apertured top portion 20 which has a depending flange 22 integrally formed therewith. Rigid projections 24 are integrally formed with and depend from the free edge of the flange 22 and have pointed ends 26. Coupler 14 is best made from sheet metal which is easily formed by standard methods and which will resist deformation when in use. However, the coupler 14 may be of a plastic wherein the rigid projections 24 would accordingly have to be modified to include a means e.g. molded detents (not shown) to lock the coupler to the flanged retainer 16 (described below).

The flanged retainer 16 is a generally annular part which includes a radially extending flange 28 and an integrally formed female connector portion 30 of a snap-type fastener. The radially extending flange 28 has its outer peripheral edge 32 formed deflected in a direction opposite from the direction in which the female connector portion 30 extends. The radially extending flange 28 has either a continuous outer diameter 34 (as seen in FIG. 5) or a non-constant outer diameter 35 (as seen in FIG. 7). Radially extending flange 28 is preferably formed with either an area of reduced thickness 36 (as seen in FIG. 6) or apertured areas 38 (as seen in FIG. 8). Both areas include adjacent inclined guide areas 40. Flanged retainer 16 may be formed of metal but preferably is of a molded plastic.

Fixed connector 18 includes a male connector portion 42, sized to be complementary to the female connector portion 30, and a support engaging portion 44. Preferably, the male connector portion 42 and support engaging portion 44 are integral and molded of a plastic type material. Support engaging portion 44 may be of various panel engaging designs including a Plalock TM rivet as manufactured by Deltar, a division of Illinois Tool Works Inc., or the panel fastener as shown in U.S. Pat. No. 4,176,428. Suport engaging portion 44 is particularly adapted to position fixedly the male connector portion 42 relative to a support surface 46. Support surface 46 may, for example, be the floor of an automobile body or the inside panel of an automobile door with apertures 48 therein at predetermined locations.

Referring now to FIG. 3 wherein a second embodiment of the invention is shown and where similar parts are designated by similar numerals with the addition of the suffix "a", the multi-part fastener 12 as seen in FIG. 3 includes two parts. The annular coupler 14 is the same as described in regard to FIG. 2, however, the flanged retainer 16 and the fixed connector 18 are herein conceptually combined as a single part 16a. The radially extending flange 28 is the same as described in regard to FIG. 2 except that the fixed connector 18a is integrally formed with the radially extending flange. It is felt that the fixed connector 18a may be of any of a variety of quick attachment devices, such as shown in U.S. Pat. No. 3,810,279. This type of quick attachment device being extremely simple to install and yet being releasable to allow removal of the carpet or panel.

In use, fastener 12 has flanged retainer 16 fixedly attached to the carpet-like member by the annular coupler 14. Annular coupler 14 is pressed through the face of the carpet-like member and then through the radially extending flange 28 of flanged retainer 16. The pointed ends 26 of the rigid projections 24 are guided into the areas of reduced thickness 36 or the apertured areas 38 by the inclined guides 40, and after penetration therethrough are staked back to lock the two fastener parts relative to the carpet-like or panel-like member. Fixed connector portion 18 is attached to the support surface, so as to have the male connector portion exposed, by the support engaging portion 44. Carpet-like member 10 and carpet pad 11 may then be releasably attached to the support surface 46 by the engagement of the male-/female connector portions.

When fastener 12 of the embodiment of FIG. 3 is used, the integrally formed flanged retainer and connector 16a are fixedly attached to the carpet-like member 10 by the annular coupler 14 in the manner as described above. The carpet-like member 10 and carpet pad 11 may then be attached to a support surface 46 by aligning the connector portion of 18a with an aperture 48 and pressing the fastener thereinto. It should be evident from applicants' discussion of the device that the only exposed portion of the fastener after installation would be the top portion of the annular coupler. By radiusing the outer peripheral edge of the coupler into the integral depending flange there is little if any way for an object which comes in contact therewith to be snagged thereby. The fastener is intended to be installed with the annular coupler being drawn snugly into the carpet to cause the deflected flange to mound the carpet-like member slightly around the annular coupler. The added benefit being not only a greater resistance to snagging but a better concealment of the coupler top portion in the surface of the carpet-like member.

It is contemplated that when applicants' device is intended to be used with padded door panel coverings, which have a rigid or semi-rigid backing, that the radially extending flange may be planar to obtain a lower profile and that the annular coupler be color coordinated.

The invention has been described in detail with particular reference to two embodiments thereof. It will be understood that variation and modifications can be effected within the spirit and scope of the invention as described hereinabove, and as defined in the following claims.

We claim:

1. A multi-part fastener adapted to releasably attach carpet-like and panel-like members to a support, said multi-part fastener comprising a plurality of fastening elements including at least first and second fastener elements, said first fastener element includes an annular coupler having a top portion and a plurality of rigid projections extending from the outer edge of one side of said top portion, said top portion having means integrally associated with the outer edge thereof for limiting snagging-type of engagement of objects that contact therewith, said second fastener element having fastening means extending from one side thereof for attachment to a support and a generally annular and radially extending flange with a non-constant outer diameter, whereby rotation of said first and second fastener elements relative to the carpet-like member is inhibited and said fastener fastening means is engageable with said support to releasably attach said carpet-like member thereto, said rigid projections of said coupler adapted to penetrate the carpet-like member and the radially extending flange of said second fastener and be folded under said flange to lock the carpet-like member between said first and second elements.

2. The multi-part fastener according to claim 1, wherein said radially extending flange of the second fastener element includes an area of a predetermined thickness.

3. The multi-part fastener according to claim 2 wherein said radially extending flange has at least one area of a reduced thickness which is less than the predetermined thickness of said flange where the projections may readily penetrate therethrough.

4. The multi-part fastener according to claim 3 wherein the radially extending flange has areas of reducing thickness between the area of predetermined thickness and the area of reduced thickness to guide the projections into the area of reduced thickness.

5. The multi-part fastener according to claim 2 wherein the radially extending flange includes a plurality of elongated apertures therein corresponding to and registrable with the plurality of rigid projections.

6. The multi-part fastener according to claim 5, wherein the area around each of said elongated apertures in the radially extending flange is inclined to guide each corresponding one of the rigid projections into one of the apertures.

7. The multi-part fastener according to claim 2 wherein said radially extending flange has its outer peripheral edge portion deflected away from the direction in which the fastening means extends, whereby the deflected portion of the flange causes a mounding of the carpet-like member around the top portion of the annular coupler.

8. The multi-part fastener according to claim 1, wherein said fastening means extending from said second fastener element includes a female portion of a two-part male/female fastening assembly and a separable male portion having means associated therewith for direct attachment to said support, whereby the carpet-like member may be releasably attached to the support by the engagement of the male and female portions of said two-part male/female fastening assembly.

9. The multi-part fastener according to claim 1, wherein the means integrally associated with the outer edge of the top portion of the coupler is a flange extending substantially perpendicularly from said one side of said top member.

10. The multi-part fastener according to claim 9, wherein the outer peripheral edge of the other side of said top member is radiused.

11. The multi-part fastener according to claim 9 wherein said plurality of rigid projections extend integrally from the free edge of said flange on said one side of the coupler, said projections being pointed at their free ends to assist in the penetration of said carpet-like mumber and said radially extending flange.

12. A multi-part fastener adapted to releasably attach carpet-like and panel-like members to a support, said multi-part fastener comprising a plurality of fastening elements including at least first and second fastener elements, said first fastener element includes an annular coupler having a top portion and a plurality of rigid projections extending from the outer edge of one side of said top portion, said top portion having means integrally associated with the outer edge thereof for limiting snagging-type of engagement of objects that contact therewith, said second fastener element having fastening means extending from one side thereof for attachment to a support and a radially extending flange, said rigid projections of said coupler adapted to penetrate the carpet-like member and the radially extending flange of said second fastener and be folded under said flange to lock the carpet-like member between said first and second fastener elements, said radially extending flange of the second fastener element includes an area of a predetermined thickness, the radially extending flange includes a plurality of elongated apertures therein corresponding to and registrable with the plurality of rigid projections, the area around each said elongated aperture in the radially extending flange is inclined to guide each corresponding one of said rigid projections into one of the apertures, and said second fastener element is generally annular with a non-constant outer diameter, whereby rotation of said first and second fastener elements relative to the carpet-like member is inhibited.

* * * * *